(12) United States Patent
Rossow

(10) Patent No.: US 12,315,389 B2
(45) Date of Patent: May 27, 2025

(54) ANATOMY EDUCATION ASSEMBLY

(71) Applicant: Jean-Esther Rossow, Olympia, WA (US)

(72) Inventor: Jean-Esther Rossow, Olympia, WA (US)

( * ) Notice: Subject to any disclaimer, the term of this patent is extended or adjusted under 35 U.S.C. 154(b) by 837 days.

(21) Appl. No.: 17/538,261

(22) Filed: Nov. 30, 2021

(65) Prior Publication Data

US 2023/0169890 A1 Jun. 1, 2023

(51) Int. Cl.
*G09B 23/30* (2006.01)

(52) U.S. Cl.
CPC .................. *G09B 23/303* (2013.01)

(58) Field of Classification Search
CPC .................................................. G09B 23/303
USPC ........................................................ 434/268
See application file for complete search history.

(56) References Cited

U.S. PATENT DOCUMENTS

| 5,634,797 | A | 6/1997 | Montgomery |
| 6,074,214 | A | 6/2000 | Browne-Wilkinson |
| 7,083,418 | B2 | 8/2006 | Baldauf |
| 7,220,127 | B2 | 5/2007 | Ellingson |
| 8,678,830 | B2 | 3/2014 | Gurdin |
| 9,576,504 | B2 | 2/2017 | Sweeney |
| 9,867,543 | B2 * | 1/2018 | Choi .................. A61B 5/742 |
| D900,255 | S | 10/2020 | Mehta |
| 2020/0135057 | A1 * | 4/2020 | Fatimi .................. G09B 23/303 |

FOREIGN PATENT DOCUMENTS

WO    WO2011094525    8/2011

OTHER PUBLICATIONS

"Laminating a chart onto a tabletop" discussion [online], WoodenBoat Forum, 2016 [retrieved on Nov. 13, 2024], retrieved from the Internet: <URL: https://forum.woodenboat.com/forum/tools-materials-techniques-products/186971-> (Year: 2016).*
"Heart & Lungs" instructions, Little Passports Science Expeditions, 2018 (Year: 2018).*

* cited by examiner

*Primary Examiner* — Robert P Bullington, Esq.
*Assistant Examiner* — Stephen Alvesteffer

(57) ABSTRACT

A anatomy education assembly includes a body table that has body indicia printed thereon. A heart table is provided which has heart indicia is printed thereon to represent the human heart. A lungs table is provided which has lung indicia printed thereon to represent human lungs. A plurality of syringes is each coupled to a respective one of the body table, the heart table and the lungs table. The plurality of syringes contains a respective first fluid which has a bluish color or a second fluid which has a reddish color. A plurality of tubes is fluidly coupled between a respective pair of the syringes thereby facilitating fluid communication between the respective pair of syringes. Each of the tubes is comprised of a translucent material to facilitate the first fluid and the second fluid to be visible while passing through the tubes for educational purposes.

8 Claims, 5 Drawing Sheets

ANATOMY EDUCATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to anatomy devices and more particularly pertains to a new anatomy device for teaching the anatomy and function of the human heart. The device includes a body table, a heart table and a lungs table. The device includes a series of syringes and tubes, each being strategically arranged to demonstrate the route of venous blood and arterial blood in the human heart. Each of the syringes is sequentially manipulated to visually demonstrate the route of venous blood and arterial blood for educational purposes.

(2) Description of Related Art Including Information Disclosed Under 37 CFR 1.97 and 1.98

The prior art relates to anatomy devices including a doll with a model of a cardiovascular system integrated into the doll for visually demonstrating the structure and function of the human cardiovascular system. The prior art discloses a variety of modular models of a human heart for facilitating examination of the structure of the human heart. The prior art discloses a modular model of a human heart that includes a catheter for practicing cardiac catheterization. The prior art discloses a hydraulic model of the human cardiovascular system that includes a plurality of pumps and a plurality of tubes.

BRIEF SUMMARY OF THE INVENTION

An embodiment of the disclosure meets the needs presented above by generally comprising a body table that has body indicia printed thereon. A heart table is provided which has heart indicia is printed thereon to represent the human heart. A lungs table is provided which has lung indicia printed thereon to represent human lungs. A plurality of syringes is each coupled to a respective one of the body table, the heart table and the lungs table. The plurality of syringes contains a respective first fluid which has a bluish color or a second fluid which has a reddish color. A plurality of tubes is fluidly coupled between a respective pair of the syringes thereby facilitating fluid communication between the respective pair of syringes. Each of the tubes is comprised of a translucent material to facilitate the first fluid and the second fluid to be visible while passing through the tubes for educational purposes.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
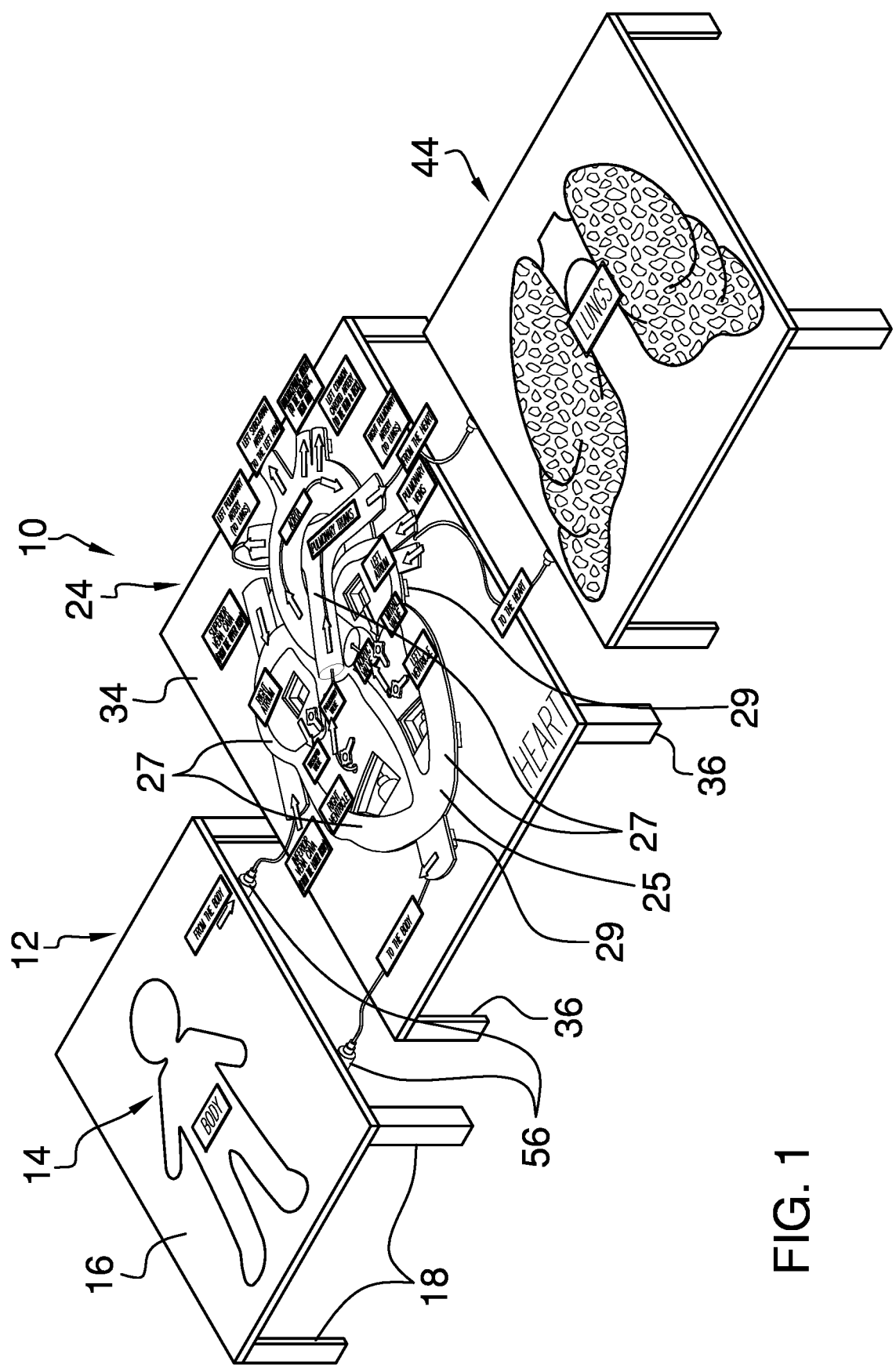
FIG. 1 is a top perspective view of an anatomy education assembly according to an embodiment of the disclosure.

With reference now to the drawings, and in particular to FIGS. 1 through 5 thereof, a new anatomy device embodying the principles and concepts of an embodiment of the disclosure and generally designated by the reference numeral 10 will be described.

As best illustrated in FIGS. 1 through 5, the anatomy education assembly 10 generally comprises a body table 12 has body indicia 14 printed thereon comprising a silhouette of a person. In this way the body table 12 represents the human body for visual educational purposes. The body table 12 has a platform 16 and a plurality of legs 18, the platform 16 has a top surface 20 and a bottom surface 22, and the body indicia 14 are printed on the top surface 20. A heart table 24 is provided that has heart indicia 26 placed thereon comprising a cross section of a human heart 28. In this way the heart table 24 can represent the human heart for visual educational purposes.

The heart indicia 26 comprise a plurality of labels 30 each describing a respective structure of the human heart to educate a viewer on the anatomy of the human heart. Furthermore, the heart indicia 26 comprise a plurality of arrows 32 that is strategically distributed on the cross section of the human heart 28. In this way the plurality of arrows 32 indicate the route of blood that is pumped through the human heart. The heart table 24 has a platform 34 and a plurality of legs 36, the platform 34 of the heart table 24 has an upper surface 38 and a lower surface 40, and the heart indicia 26 are printed on the upper surface 38. The platform of the heart table 24 has a plurality of windows 42 each extending through the upper surface 38 and the lower surface 40. Additionally, each of the windows 42 is aligned with a respective structure displayed by the heart indicia 26.

Figure 2:
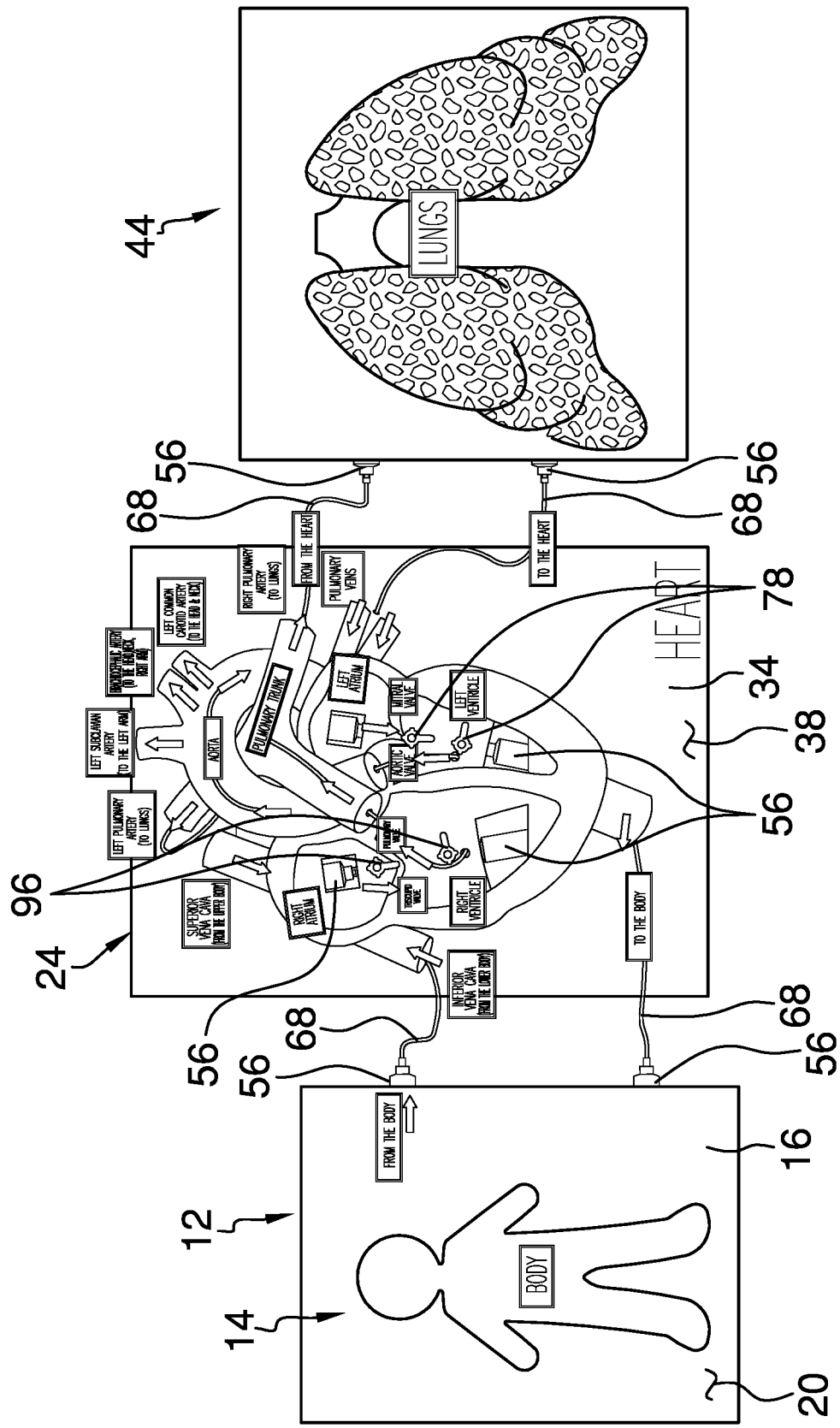
FIG. 2 is a top view of an embodiment of the disclosure.
Figure 3:
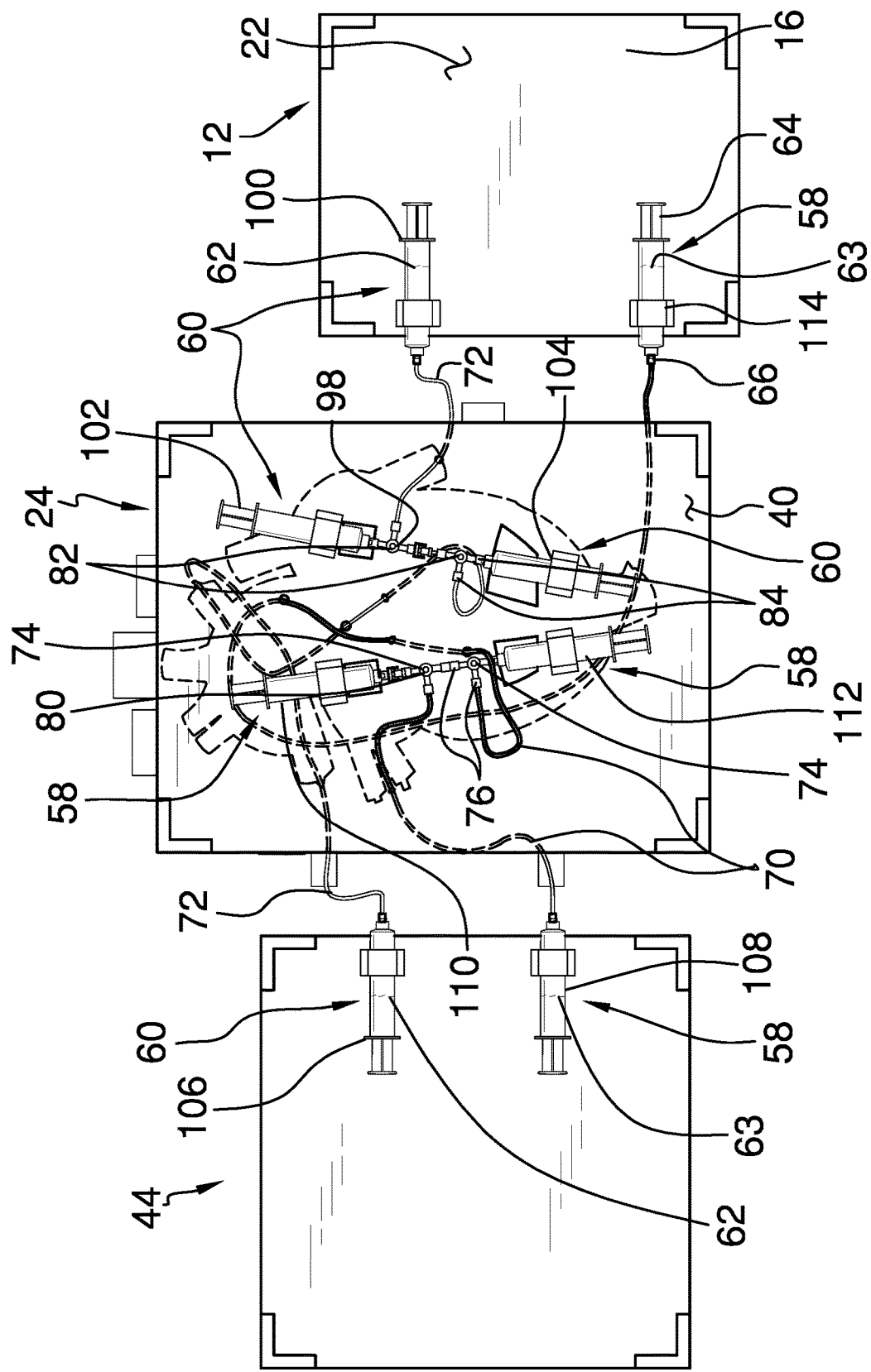
FIG. 3 is a bottom view of an embodiment of the disclosure.
Figure 4:
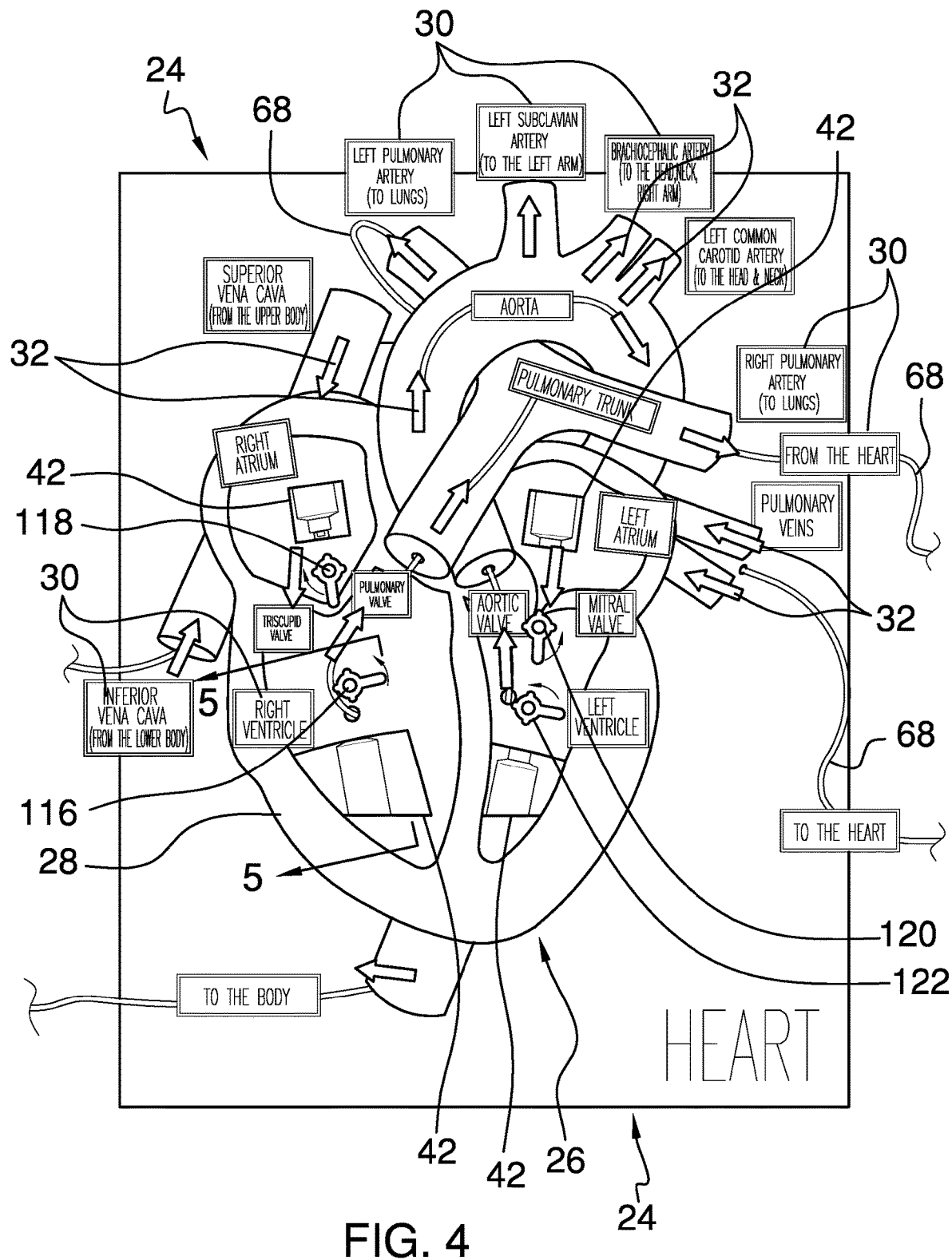
FIG. 4 is a top view of a heart table of an embodiment of the disclosure.
Figure 5:
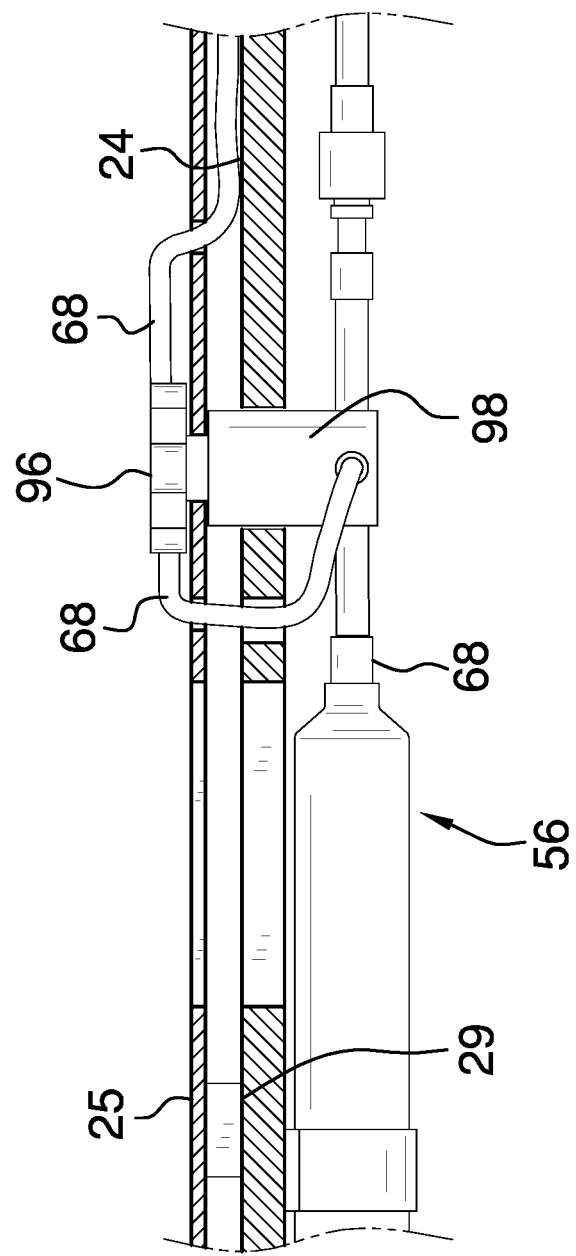
FIG. 5 is a cross sectional view taken along line 5-5 of FIG. 4 of an embodiment of the disclosure.

As is most clearly shown in FIG. 2, the plurality of labels 30 may include, but not be limited to, labels for the right atrium, the right ventricle, the left atrium, the left ventricle, each of the valves in the heart, and the proper names of each of the arteries and veins associated with the human heart. In this way the viewer can learn the name and location of each of the elements of the anatomy of the human heart. Furthermore, the arrows 32 facilitate the viewer to learn the route of blood with the respect to the elements of the anatomy of the human heart. Each of the windows 42 is aligned with a respective one of the right atrium, the left atrium, the right ventricle and the left ventricle. The cross section of the human heart 28 comprises a panel 25 which has a series of undulating members 27 that are strategically arranged to define each of the major structures of the human heart in a cross sectional view. Additionally, the panel 25 includes a plurality of spacers 29 which engage the upper surface 38 of the platform 34 of the heart table 24 to space the panel 25 from the upper surface 38.

A lungs table 44 is provided which has lung indicia 46 printed thereon comprising an image of human lungs. In this way the lungs table 44 can represent human lungs for visual educational purposes. The lungs table 44 has a platform 48 and a plurality of legs 50, the platform 48 of the lungs table 44 has a topmost surface 52 and a bottommost surface 54, and the lung indicia 46 are printed on the topmost surface 52. Additionally, the lung indicia 46 may comprise a label indication the name of the lungs.

A plurality of syringes 56 is provided and each of the syringes 56 is coupled to a respective one of the body table 12, the heart table 24 and the lungs table 44. The plurality of syringes 56 comprises a set of arterial syringes 58 and a set of venous syringes 60. Each of the venous syringes 60 contains a first fluid 62 that has a bluish color to visually represent venous blood. Each of the arterial syringes 58 contains a second fluid 63 that has a reddish color to visually represent venous blood. Additionally, each of the syringes 56 includes a plunger 64 and an outlet 66.

Each of the plurality of syringes 56 associated with the heart table 24 is aligned with a respective one of the windows 42 in the platform of the heart table 24. Each of the syringes 56 associated with the body table 12 is positioned on the bottom surface 22 of the platform of the body table 12. Furthermore, each of the syringes 56 associated with the heart table 24 is positioned on the lower surface 40 of the platform of the heart table 24. Each of the syringes 56 associated with the lungs table 44 is positioned on the bottommost surface 54 of the platform of the lungs table 44.

A plurality of tubes 68 is provided and each of the tubes 68 is fluidly coupled between a respective pair of the syringes 56 thereby facilitating fluid communication between the respective pair of syringes 56. Additionally, each of the tubes 68 is comprised of a translucent material to facilitate the first fluid 62 and the second fluid 63 to be visible while passing through the tubes 68 for educational purposes. In this way the viewer can see the path of blood as is moves through the human heart. The plurality of tubes 68 includes a set of arterial tubes 70 and a set of venous tubes 72.

A plurality of arterial valves 74 is provided and each of the arterial valves 74 is movably integrated into the heart table 24. Each of the arterial valves 74 has a plurality of ports 76 and each of the arterial tubes 70 is fluidly coupled between the outlet 66 of a respective arterial syringe 58 and a respective port 76 on a respective arterial valve 74. Each of the arterial valves 74 is positionable in a first condition to pass the second fluid 63 in a first direction through the arterial valves 74. Conversely, each of the arterial valves 74 is positionable in a second condition to pass the second fluid 63 in a second direction through the arterial valves 74. Each of the arterial valves 74 includes a handle 78 that is spaced from the topmost surface 52 of the platform of the heart table 24 and a valve body 80 that is spaced from the bottommost surface 54 of the platform of the heart table 24. Additionally, each of the arterial valves 74 is positioned adjacent to a respective one of the windows 42 that are each aligned with the respective left atrium and left ventricle.

A plurality of venous valves 82 is provided and each of the venous valves 82 is movably integrated into the heart table 24. Each of the venous valves 82 has a plurality of ports 84 and each of the venous tubes 72 is fluidly coupled between the outlet 66 of a respective venous syringe 60 and a respective port 84 on a respective venous valve 82. Each of the venous valves 82 is positionable in a first condition to pass the first fluid 62 in a first direction through the venous valves 82. Furthermore, each of the venous valves 82 is positionable in a second condition to pass the first fluid 62 in a second direction through the venous valves 82. Each of the venous valves 82 includes a handle 96 that is spaced from the topmost surface 52 of the platform of the heart table 24 and a valve body 98 that is spaced from the bottommost surface 54 of the platform of the heart table 24.

Additionally, each of the venous valves 82 is positioned adjacent to a respective one of the windows 42 that are each aligned with the respective left atrium and left ventricle.

The plurality of venous syringes 60 includes a first syringe 100, a second syringe 102, a third syringe 104 and a fourth syringe 106. The plurality of arterial syringes 58 includes a fifth syringe 108, a sixth syringe 110, a seventh syringe 112 and an eighth syringe 114. The first syringe 100 is positioned on the body table 12, each of the second syringe 102 and the third syringe 104 are positioned on the heart table 24 and the fourth syringe 106 is positioned on the lungs table 44. The fifth syringe 108 is positioned on the lungs table 44, each of the sixth syringe 110 and the seventh syringe 112 is positioned on the heart table 24 and the eighth syringe 114 is positioned on the body table 12.

The plurality of venous valves 82 includes a first valve 116 and a second valve 118. The plurality of arterial valves 74 includes a third valve 120 and a fourth valve 122. The first valve 116 is positioned between the first syringe 100 and the second syringe 102, and the second valve 118 is positioned between the second syringe 102 and the third syringe 104. Continuing, the third valve 120 is positioned between the fifth syringe 108 and the sixth syringe 110, and the fourth valve 122 is positioned between the seventh syringe 112 and the eighth syringe 114.

In use, the plunger in the first syringe 100 is depressed to urge the first fluid 62 through the first valve 116, which is positioned in the first condition, and into the second syringe 102. The first valve 116 is manipulated into the second condition and the plunger on the second syringe 102 is depressed to urge the first fluid 62 through the second valve 118, which is positioned in the first condition, and into the third syringe 104. The second valve 118 is manipulated into the second condition and the plunger on the third syringe 104 is depressed to urge the first fluid 62 through the second valve 118 and into the fourth syringe 106. In this way the viewer can observe the path of venous blood as it moves through the heart and lungs.

The plunger on the fifth syringe 108 is depressed to urge the second fluid 63 through the third valve 120, which is in the first condition, and into the sixth syringe 110. The third valve 120 is manipulated into the second condition and the plunger on the sixth syringe 110 is depressed to urge the second fluid 63 through the fourth valve 122, which is in the first condition, and into the seventh syringe 112. The fourth valve 122 is manipulated into the second condition and the plunger on the seventh syringe 112 is depressed to urge the second fluid 63 through the fourth valve 122 and into the eighth syringe 114. In this way the viewer can observe the path of arterial blood as is moves through the heart and lungs.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An anatomy education assembly for visually demonstrating the structure and function of the human heart, said assembly comprising:
    a body table having body indicia being printed thereon comprising a silhouette of a person wherein said body table is configured to represent the human body;
    a heart table having heart indicia being printed thereon comprising a cross section of a human heart wherein said heart table is configured to represent the human heart, said heart indicia comprising a plurality of labels each describing a respective structure of the human heart wherein each of said labels is configured to educate a view on the anatomy of the human heart, said heart indicia comprising a plurality of arrows being strategically distributed on said cross section of the human heart wherein said plurality of arrows is configured to indicate the route of blood being pumped through the human heart;
    a lungs table having lung indicia being printed thereon comprising an image of human lungs wherein said lungs table is configured to represent human lungs;
    a plurality of syringes, each of said syringes being coupled to a respective one of said body table, said heart table and said lungs table, said plurality of syringes comprising a set of venous syringes and a set of arterial syringes, each of said venous syringes containing a first fluid having a bluish color wherein said first fluid is configured to visually represent venous blood, each of said arterial syringes containing a second fluid having a reddish color wherein said second fluid is configured to visually represent arterial blood;
    a plurality of tubes, each of said tubes being fluidly coupled between a respective pair of said syringes thereby facilitating fluid communication between said respective pair of syringes, each of said tubes being comprised of a translucent material wherein said plurality of tubes is configured to facilitate said first fluid and said second fluid to be visible while passing through said tubes for educational purposes;
    wherein said body table has a first platform and a first plurality of legs, said platform having a top surface and a bottom surface, said body indicia being printed on said top surface; and
    wherein each of said syringes associated with said body table being positioned on said bottom surface of said first platform.

2. The assembly according to claim 1, wherein:
    each of said syringes includes a plunger and an outlet;
    said plurality of tubes includes a set of arterial tubes; and
    said assembly includes a plurality of arterial valves, each of said arterial valves being movably integrated into said heart table, each of said arterial valves having a plurality of ports, each of said arterial tubes being fluidly coupled between said outlet of a respective arterial syringe and a respective port on a respective arterial valve.

3. The assembly according to claim 2, wherein each of said arterial valves is positionable in a first condition to pass said second fluid in a first direction through said arterial valves, each of said arterial valves being positionable in a second condition to pass said second fluid in a second direction through said arterial valves.

4. The assembly according to claim 1, wherein:
    each of said syringes includes a plunger and an outlet;
    said plurality of tubes includes a set of venous tubes; and
    said assembly includes a plurality of venous valves, each of said venous valves being movably integrated into said heart table, each of said venous valves having a plurality of ports, each of said venous tubes being fluidly coupled between said outlet of a respective venous syringe and a respective port on a respective venous valve.

5. The assembly according to claim 4, wherein each of said venous valves is positionable in a first condition to pass said first fluid in a first direction through said venous valves, each of said venous valves being positionable in a second condition to pass said first fluid in a second direction through said venous valves.

6. The assembly according to claim 1, further comprising:
    said heart table having a second platform and a second plurality of legs, said second platform having an upper surface and a lower surface, said heart indicia being printed on said upper surface, said second platform having a plurality of windows each extending through said upper surface and said lower surface, each of said windows being aligned with a respective structure displayed by said heart indicia;
    said lungs table having a third platform and a third plurality of legs, said third platform having a topmost surface and a bottommost surface, said lung indicia being printed on said topmost surface;

each of said plurality of syringes associated with said heart table being aligned with a respective one of said windows in said second platform, each of said syringes associated with said body table being positioned on said bottom surface of said first platform, each of said syringes associated with said heart table being positioned on said lower surface of said second platform, each of said syringes associated with said lungs table being positioned on said bottommost surface of said third platform, each of said syringes including a plunger and an outlet;

said plurality of tubes including a set of arterial tubes and a set of venous tubes; and a plurality of arterial valves, each of said arterial valves being movably integrated into said heart table, each of said arterial valves having a plurality of ports, each of said arterial tubes being fluidly coupled between said outlet of a respective arterial syringe and a respective port on a respective arterial valve, each of said arterial valves being positionable in a first condition to pass said second fluid in a first direction through said arterial valves, each of said arterial valves being positionable in a second condition to pass said second fluid in a second direction through said arterial valves; and a plurality of venous valves, each of said venous valves being movably integrated into said heart table, each of said venous valves having a plurality of ports, each of said venous tubes being fluidly coupled between said outlet of a respective venous syringe and a respective port on a respective venous valve, each of said venous valves being positionable in a first condition to pass said first fluid in a first direction through said venous valves, each of said venous valves being positionable in a second condition to pass said first fluid in a second direction through said venous valves.

7. An anatomy education assembly for visually demonstrating the structure and function of the human heart, said assembly comprising:

a body table having body indicia being printed thereon comprising a silhouette of a person wherein said body table is configured to represent the human body;

a heart table having heart indicia being printed thereon comprising a cross section of a human heart wherein said heart table is configured to represent the human heart, said heart indicia comprising a plurality of labels each describing a respective structure of the human heart wherein each of said labels is configured to educate a view on the anatomy of the human heart, said heart indicia comprising a plurality of arrows being strategically distributed on said cross section of the human heart wherein said plurality of arrows is configured to indicate the route of blood being pumped through the human heart;

a lungs table having lung indicia being printed thereon comprising an image of human lungs wherein said lungs table is configured to represent human lungs;

a plurality of syringes, each of said syringes being coupled to a respective one of said body table, said heart table and said lungs table, said plurality of syringes comprising a set of venous syringes and a set of arterial syringes, each of said venous syringes containing a first fluid having a bluish color wherein said first fluid is configured to visually represent venous blood, each of said arterial syringes containing a second fluid having a reddish color wherein said second fluid is configured to visually represent arterial blood;

a plurality of tubes, each of said tubes being fluidly coupled between a respective pair of said syringes thereby facilitating fluid communication between said respective pair of syringes, each of said tubes being comprised of a translucent material wherein said plurality of tubes is configured to facilitate said first fluid and said second fluid to be visible while passing through said tubes for educational purposes;

wherein said heart table has a platform and a plurality of legs, said platform of said heart table having an upper surface and a lower surface, said heart indicia being printed on said upper surface, said platform of said heart table having a plurality of windows each extending through said upper surface and said lower surface, each of said windows being aligned with a respective structure displayed by said heart indicia;

wherein each of said plurality of syringes associated with said heart table is aligned with a respective one of said windows in said platform of said heart table; and wherein each of said syringes associated with said heart table is positioned on said lower surface of said platform of said heart table.

8. An anatomy education assembly for visually demonstrating the structure and function of the human heart, said assembly comprising:

a body table having body indicia being printed thereon comprising a silhouette of a person wherein said body table is configured to represent the human body;

a heart table having heart indicia being printed thereon comprising a cross section of a human heart wherein said heart table is configured to represent the human heart, said heart indicia comprising a plurality of labels each describing a respective structure of the human heart wherein each of said labels is configured to educate a view on the anatomy of the human heart, said heart indicia comprising a plurality of arrows being strategically distributed on said cross section of the human heart wherein said plurality of arrows is configured to indicate the route of blood being pumped through the human heart;

a lungs table having lung indicia being printed thereon comprising an image of human lungs wherein said lungs table is configured to represent human lungs;

a plurality of syringes, each of said syringes being coupled to a respective one of said body table, said heart table and said lungs table, said plurality of syringes comprising a set of venous syringes and a set of arterial syringes, each of said venous syringes containing a first fluid having a bluish color wherein said first fluid is configured to visually represent venous blood, each of said arterial syringes containing a second fluid having a reddish color wherein said second fluid is configured to visually represent arterial blood;

a plurality of tubes, each of said tubes being fluidly coupled between a respective pair of said syringes thereby facilitating fluid communication between said respective pair of syringes, each of said tubes being comprised of a translucent material wherein said plurality of tubes is configured to facilitate said first fluid and said second fluid to be visible while passing through said tubes for educational purposes;

wherein said lungs table has a platform and a plurality of legs, said platform of said lungs table having a topmost surface and a bottommost surface, said lung indicia being printed on said topmost surface; and wherein each of said syringes associated with said lungs table is positioned on said bottommost surface of said platform of said lungs table.

\* \* \* \* \*